United States Patent

Neuman et al.

[11] Patent Number: 5,828,491
[45] Date of Patent: Oct. 27, 1998

[54] PHASE PLATE TECHNOLOGY FOR LASER MARKING OF MAGNETIC DISCS

[75] Inventors: Bill Neuman; John Honig; Lloyd Hackel; C. Brent Dane; Shamasundar Dixit, all of Livermore, Calif.

[73] Assignee: The Regents of the University of California, Oakland, Calif.

[21] Appl. No.: 777,680

[22] Filed: Dec. 20, 1996

[51] Int. Cl.⁶ .......................... G02B 27/24; G02B 27/46; G02B 5/18; G03F 9/00
[52] U.S. Cl. .......................... 359/565; 359/559; 359/563; 359/568; 359/569; 430/5; 219/121.68
[58] Field of Search ..................... 359/559, 560, 359/561, 565, 568, 569; 430/5; 364/724.01, 724.02; 219/121.68

[56] References Cited

U.S. PATENT DOCUMENTS

| | | | |
|---|---|---|---|
| 4,933,649 | 6/1990 | Swanson et al. | 359/569 |
| 5,062,021 | 10/1991 | Ranjan et al. | 360/135 |
| 5,477,383 | 12/1995 | Jain | 359/565 |
| 5,633,735 | 5/1997 | Hunter et al. | 359/565 |

*Primary Examiner*—Jon W. Henry
*Assistant Examiner*—Audrey Chang
*Attorney, Agent, or Firm*—John P. Wooldridge

[57] ABSTRACT

An advanced design for a phase plate enables the distribution of spots in arbitrarily shaped patterns with very high uniformity and with a continuously or near-continuously varying phase pattern. A continuous phase pattern eliminates large phase jumps typically expected in a grating that provides arbitrary shapes. Large phase jumps increase scattered light outside of the desired pattern, reduce efficiency and can make the grating difficult to manufacture. When manufacturing capabilities preclude producing a fully continuous grating, the present design can be easily adapted to minimize manufacturing errors and maintain high efficiencies. This continuous grating is significantly more efficient than previously described Dammann gratings, offers much more flexibility in generating spot patterns and is easier to manufacture and replicate than a multi-level phase grating.

22 Claims, 1 Drawing Sheet

PHASE PLATE TECHNOLOGY FOR LASER MARKING OF MAGNETIC DISCS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to diffraction gratings and laser marking of magnetic discs, and more specifically, it relates to a method for designing and building a continuous or multi-step phase grating.

2. Description of Related Art

Magnetic recording disks are required to have areas which are controllably textured, especially areas where the transducing head is allowed to contact the disk. The texturing reduces the friction encountered by the head during the "spin up," allowing more rapid disk activation and reduced wear on the heads. In current manufacturing processes, the texturing is accomplished in an off line step prior to the main manufacturing which occurs in the disk sputtering system. This texturing is currently done with an abrasive grit based process and requires costly cleaning of the disk prior to insertion into the sputtering system.

A process using a low power focused laser output to generate texture spots has been discussed (Ranjan et al., U.S. Pat. No. 5,062,021) but no practical means of implementing the process, which requires as many as 200,000 texture spots on a disk, was discussed. In this process, the short pulse output (15 ns) of a low power laser (4 $\mu$J) is focused to a spot size of roughly 10 $\mu$m diameter. The laser energy locally heats the substrate and produces a small crater with a rim rising above the substrate surface. The integrated surface area projected locally by the rims is significantly less than that of the polished substrate. Consequently friction is significantly reduced and disk performance and lifetime greatly improved.

In U.S. patent application Ser. No. 08/665,275, titled Laser Illuminator and Optical System For Disk Patterning, filed Jun. 17, 1996, which is incorporated herein by reference, and relates to laser texturing of magnetic disks, a phase plate grating that consisted of binary phase steps in a repeated pattern of unit cells as well as a multi-level phase grating of similar unit cell construction is discussed. Each unit cell consists of a binary phase grating having a distribution of regions that introduce discrete phase delays of 0 or $\pi$ to the beam. This binary technology works, but suffers from low efficiency (typically 40%) and, even more importantly, it does not lend itself to generating pre-defined or arbitrarily shaped arrays of spots having spot arrays of uniform or other tailored irradiance profiles in a pre-defined way within the pattern. (In the case of the disk texturing, using multi-level or continuous phase gratings allows one to texture large sectors of arbitrary shape with a single laser pulse, while maintaining spot-to-spot uniformity over the many thousands of spots within the sector. The ability to texture arbitrary sector shapes removes the need for hard aperture masks near the disk surface to prevent texturing outside the landing zone and into the data zone. This results in arrays of spots having arbitrary array shape and spots having well defined spot-to-spot irradiance.

SUMMARY OF THE INVENTION

It is an object of the invention to provide a continuous and a multi-step phase grating.

The present invention is an advanced design for a phase plate that enables the distribution of spots in arbitrarily shaped (pre-defined) patterns with very high irradiance control and with a continuously or near-continuously varying phase pattern. A continuous phase pattern eliminates large phase jumps typically expected in a grating that provides arbitrary shapes. Large phase jumps increase scattered light outside of the desired pattern, reduce efficiency and can make the grating difficult to manufacture. When manufacturing capabilities preclude producing a fully continuous grating, the present design can be easily adapted to minimize manufacturing errors and maintain high efficiencies. This continuous grating is significantly more efficient than previously described Dammann gratings, offers much more flexibility in generating spot patterns and is easier to manufacture and replicate than a multi-level phase grating.

In the method for designing a phase plate according to the present invention, an assumed grating phase profile is first added to a laser beam profile and then a Fourier transform is taken of the result. Each far field beam that is located within a desired pattern is multiplied by a filter. Each beam located outside the desired pattern and greater than a specified maximum threshold irradiance is multiplied by a second filter. The inverse Fourier transform of the modified far field is calculated to obtain the near field at the location of the grating, and the new grating phase is extracted from this electric field. The near field at the location of the grating is scaled so that it matches the input laser irradiance profile, while the new grating phase is left unchanged. This process is repeated until the grating phase has converged to a desired tolerance, producing a desired beamlet pattern.

The invention allows for many more degrees of freedom in the design process and results in the ability to generate arbitrary shapes in the far field with a high degree of control of the irradiance within the pattern and high efficiency (up to 80% and greater) in transporting laser light into the pattern. This continuous phase distribution includes both low and high spatial frequencies with the unit cell having the appearance of a "wavy lens." In one embodiment, the pattern array is in the shape of a sector of an annulus of approximately 12 degrees of arc length with a uniform rectangular distribution of spots (approximately 70×70 spots within the array).

This type of phase plate can also be used to produce uniformly illuminated sharp-edged beam profiles with arbitrary beam outer perimeters. This capability can potentially have a broad range of applications in telecommunications, entertainment and laser system applications where it is desired to generate randomly shaped, uniform (or controlled) intensity areas in either single or multiple beam patterns.

The process for the design and manufacturing of a grating begins with the requirements given by the disk manufacturer. The disk manufacturer has requirements for dimple diameter, dimple spacing, dimple variation, landing zone radius and overall landing zone width. Dimples which may fall outside of the landing zone must be less than the surface roughness, generally ~±3 nm. Typical numbers are: dimple diameter (d.d)<10 $\mu$m, dimple spacing (s)=60 $\mu$m, dimple variation<±10%, landing zone radius (lz.r)=19 mm, and overall landing zone width (lz.w)=4 mm.

DETAILED DESCRIPTION OF THE INVENTION

The present invention is a phase plate design in which a near continuous distribution of phases is used. This concept allows for many more degrees of freedom in the design process and results in the ability to generate arbitrary shapes in the far field with a high degree of control of the intensity within the pattern and high efficiency (up to 80% and greater) in transporting laser light into the pattern. This continuous phase distribution includes both low and higher spatial frequencies with the unit cell having the appearance of a "wavy lens." In one embodiment, the pattern array has a trapezoidal pie shape of approximately 12 degrees of arc length with a uniform rectangular distribution of spots (approximately 70×70 spots within the array).

Figure 1:
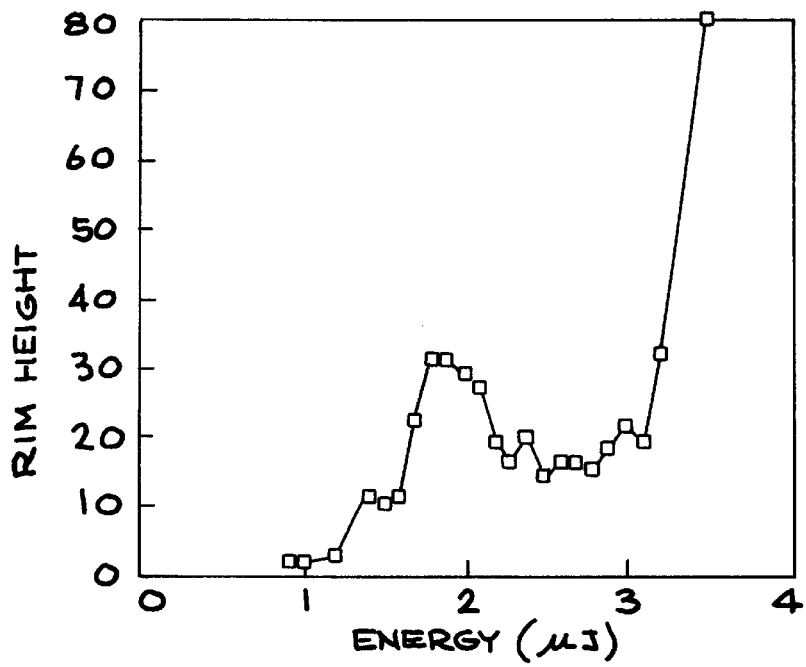
FIG. 1 shows dimple height dependency on laser energy.

FIG. 1 shows a series of measurements of a laser textured disk and identifies the relationship between the rim height of the spots generated as a function of the incident laser energy. In particular, the data shows a regime in laser energy density where the printed spot rim height is somewhat insensitive to laser energy density. This insensitive regime area reduces the required uniformity of the generated spot pattern to still achieve a uniform printed spot height. The data also show that in the regions of low energy density, printing no longer occurs. This later information means that the phase plate design does not have to effect complete elimination of energy in order to eliminate printing in undesired regions. Thus, the phase grating does not have to drive the laser irradiance to zero outside the desired print area. These two effects significantly reduce the complication of designing a phase plate which will print a uniform array in the regions where spots are desired and prevent printing in undesired regions without aperturing the laser beam. Identification has been made of at least 4 unit cells in each direction that must be illuminated to achieve the high definition pattern required. Therefore, the phase plate must consist of at least 4 by 4 unit cells.

By coupling the information shown in FIG. 1 into the phase plate design, a phase plate structure can be specified which produces a highly uniform pattern of the desired irregular triangular and scalloped shaped patterned area which will not print outside the desired area. These scalloped shaped areas can be tailored with asymmetric left and right hand beam patterns to facilitate stitching individual sectors together to produce a continuous annulus having seamlessly stitched annulus sectors on a disk. This grating has a continuous, or near continuous, variation of phase and is consequently easy to manufacture by simple patterning and ion-etch techniques. When manufacturing capabilities preclude producing a fully continuous grating, the current design can be easily adapted to minimize manufacturing errors and maintain high efficiencies with multi-level grating manufacturing techniques. Additionally, in the case of continuous phase gratings, replica gratings in plastic are easily manufactured from negatives of the original design. The continuous nature of the phase variations allows easy manufacture of replica gratings in plastic from a negative of the original design. Additional disk patterning specification may require varying dimple height at different disk radii for increased performance. Varying dimple height in a controlled fashion is an embodiment of this technology where the irradiance in the patterned area is now specified as a prescribed profile rather than uniform.

This type of phase plate can also be used to produce uniformly illuminated sharp-edged beam profiles with arbitrary beam outer perimeters. This capability can potentially have a broad range of applications in telecommunications, entertainment and laser system applications where it is desired to generate randomly shaped, uniform (or controlled) irradiance areas in either single or multiple beam patterns.

The process for the design and manufacturing of a grating begins with the requirements given by the disk manufacturer. The disk manufacturer has requirements for dimple diameter, dimple spacing, dimple variation, landing zone radius and overall landing zone width. Dimples which may fall outside of the landing zone must have a height less than the surface roughness, generally ~±3 nm. Typical numbers are: dimple diameter (d.d)<10 $\mu$m, dimple spacing (s)=60 $\mu$m, dimple height variation<±10%, landing zone radius (lz.r)=19 mm, and overall landing zone width (lz.w)=4 mm.

The dimple diameter, d.d, is experimentally given by d.d~(f#)($\lambda$)(DL), where f# is the f-number of the focusing lens, $\lambda$ is the laser wavelength and DL is the measure of beam quality in number of times diffraction limited. For diffraction limited beams, one can obtain 10 $\mu$m diameter dimples with an f# of 10. For more realistic beams (e.g., DL of 2), one requires an f# of 5 or less. The dimple spacing, s, is given by s=($\lambda$)(f)/(d.u), where d.u is the unit cell size and f is the focal length of the focusing lens. A unit cell is made up of a number of individual pixels where the pixel is the smallest resolvable element in the unit cell. Smaller pixel size and more pixels per unit cell lead to better grating resolution. Standard photolithographic techniques become more difficult below 5 $\mu$m pixel size. For s=60 $\mu$m and 1000×1000 5-$\mu$m pixels per unit cell (d.u.=5 mm), the required focal length is 300 mm. The usable lens diameter should then be>60 mm to obtain the desired dimple diameters. To ensure that a grating gives the desired dimple resolution requires a minimum of 4×4=16 unit cells, well within the design of this example.

Lens and grating design are both simplified if the dimple pattern is as symmetric as possible. To print a full landing zone width sector requires ~(lz.w/s)$^2$18 4500 dimples per shot. The energy density uniformity due to the grating must be better than±5% within the desired area to allow headroom for other possible variations in the overall system. Outside the desired area, the energy density must be<20% of the printing energy density. At these low energies, dimple heights are below the polishing heights on the disk.

Other dimple spacings and dimple diameters can be obtained by simply adjusting lens focal lengths and unit cell sizes in a self-consistent manner as shown above.

To further illustrate the design of a grating according to the present invention, an example customer provides the following requirements: a 4 mm annulus landing zone (lz.w=4 mm) centered at radius 19 mm (lz.r=19 mm), consisting of 20 nm high dimples (<±10%), with dimple diameters no greater than 10 $\mu$m (d.d<10 $\mu$m), and a center-to-center dimple spacing of 60 $\mu$m (s=60 $\mu$m). (The absolute dimple height is not as important as the height uniformity as long as the average height, whatever it may be, falls between 15 nm and 23 nm.) Dimples outside the landing zone, if they exist, must be less than the surface roughness (<3 nm). In addition, the final lens should be no greater than 75 mm in diameter (D<75 mm).

From these requirements and the procedure outlined above, the grating and final lens requirements can be determined. Assume that the laser is a Nd:YAG laser operating at $\lambda$=1064 nm and is two times diffraction limited (DL=2). The dimple diameter, d.d <10 $\mu$m, requires an f#<5. To allow some safety margin, an f#=4 system is chosen. Lenses with f#<4 are both expensive and difficult to fabricate. The focal length of the final lens, f, given by f#=f/D, is then f=300 mm. The desired dimple spacing, s=(λ)(f)/(d.u)=60 μm, determines the unit cell size, d.u=5 mm. A grating consisting of 100 unit cells (10×10) can still be circumscribed by the final lens diameter of 75 mm.

To pattern a disk in an integral number of shots (sectors) where the outline of each sector is as square as possible, defines a 12° sector (30 shots per disk) with 68×73 dimples (68 radial, 73 tangential). The left and right radial boundaries of the sectors have asymmetric beam patterns to afford continuous dimple patterns at the sector seams. The uniformity across the array should be better than±5%. A typical dimple height vs. pulse energy plot is shown in FIG. 1. Notice that a relatively flat (insensitive to energy) operating range exists between 2.2 μJ and 3.1 μJ and that no printing occurs below 1.2 μJ. If scaling of 2.65 μJ is made to 100%, it can be seen that the rim height remains flat with energies of 100±15% and no printing occurs for energies below 40%. Using appropriate safety margins, the grating design will be uniform to±5% and any non-printing dimples be held to<20%. The region between 2.2 mJ and 3.1 mJ generates the desired dimple height and is insensitive to changes in pulse energy.

Figure 2A:
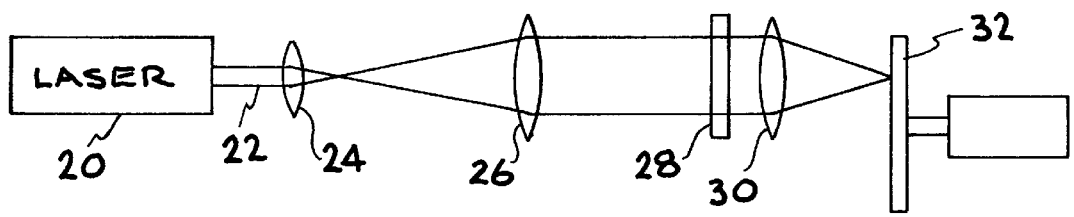
FIG. 2A shows an embodiment of a complete disc marking system.
Figure 2B:
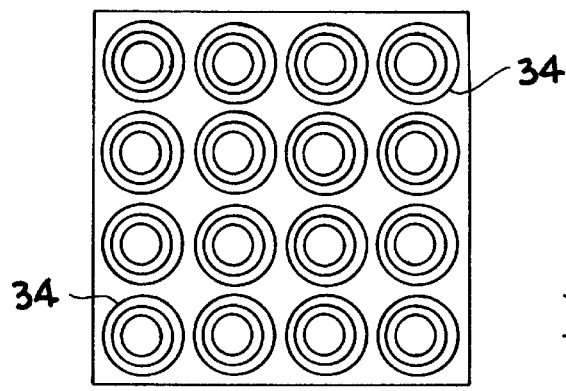
FIG. 2B shows an example 4 by 4 grating used in the embodiment of FIG. 2A.

The grating used to generate the desired array of beamlets is designed using a Fourier transform based computer code. The beamlets are generated by adding a phase delay to the laser beam in the near field (before the final focusing lens) which produces the array of beamlets in the far field. FIG. 2A shows an embodiment of the system comprising a laser 20 which produces a laser beam 22 that is expanded by lens 24 and recollimated by lens 26. Lenses 24 and 26 together form a beam expansion telescope. Beam 22 goes through a focus between lenses 24 and 26. Grating 28 is placed between lens 26 and focusing lens 30, which focuses beam 22 onto a rotating disc 32. FIG. 2B shows an example of a grating 28 having 4 by 4 unit cells 34. The calculation is performed over a unit cell 34 of the grating 28 in two spatial dimensions. A one-dimensional calculation is not possible since the desired beamlet pattern is asymmetric. The calculation procedure is iterative allowing a starting estimate of the phase profile of the grating as a lens like phase with the appropriate angular divergence consistent with the desired beamlet pattern. A lens like phase is a phase with a parabolic or other smoothly varying higher order phase profile. This phase profile is refined until the desired beamlet pattern accuracy is achieved. An iteration consists of the following steps.

1) The far field beamlet pattern is calculated (at the focus of the final lens) with an assumed grating phase profile added to the beam. This is done by taking the Fourier transform of the near field.
2) The newly generated far field pattern is compared to the desired beamlet pattern. If the irradiance of any of the desired beamlets does not equal the expected value, the field at that location is multiplied by a filter equal to $$\text{filter} = \left[ 1 + \Delta \frac{I_{exp} - I}{I} \right]^{1/2}$$

where Δ is a relaxation parameter that is a number between 0 and 1, I is the calculated irradiance, $I_{exp}$ is the expected irradiance. The expected irradiance is found by considering the total number of beamlets and the overall efficiency desired for the grating. The irradiance at the locations outside the desired beamlets is also weighted similarly to reduce it below the threshold energy as discussed above.

3) The modified far field is then inverted back to the near field (at the grating position). At this location the phase of the electric field is taken to be the new grating phase; however, the resulting irradiance profile may not be that of the input laser (which is typically assumed uniform).
4) If the new near field irradiance profile does not match the input laser profile the electric field magnitude is scaled to make the irradiance profiles equal. This scaling is done so that the derived phase profile is unchanged as the phase profile is assumed to be the resulting grating phase.

Steps 1–4 are repeated until the grating phase has converged to the desired tolerance, producing the prescribed beamlet pattern.

The choice of the starting guess for the grating can significantly alter the final phase profile of the resulting grating. An initial starting guess which gives rise to a continuous phase variation across the grating is a lens-like phase profile across the grating unit cell. By adjusting the magnitude of the initial lens-like phase, the angular spectrum of the beamlets can be controlled. The final result is a grating which can be described as a two dimensional array of wavy lenslets with a spatial period corresponding to the required unit cell size as discussed above.

Accordingly, the phase plate of the present invention can be designed by: (i) adding an assumed grating phase profile to a laser beam profile to calculate a modified laser beam profile; (ii) calculating a Fourier transform of the modified laser beam profile to produce a calculated far field laser beam comprising a plurality of beams; (iii) multiplying each beam of the plurality of beams that is located within a desired pattern by a filter according to the equation $$\text{filter} = \left[ 1 + \Delta \frac{I_{desired} - I}{I} \right]^{1/2}$$

to produce a modified far field, where Δ is a relaxation parameter, I is calculated irradiance, and $I_{desired}$ is the desired irradiance at each beam of the plurality of beams within the desired pattern; (iv) multiplying each beam of the plurality of beams that is located outside the desired pattern and greater than a specified maximum threshold irradiance $I_{threshhold}$ by a second filter according to the equation $$\text{second filter} = \left[ 1 + \Delta \frac{I_{threshold} - I}{I} \right]^{1/2}$$

to produce a further modified far field; (v) calculating the inverse Fourier transform of the further modified far field to obtain the near field at the location of the grating, where the new grating phase is extracted from this electric field; (vi) scaling the near field at the location of the grating so that it matches the input laser irradiance profile, where the new grating phase is unchanged; and (vii) repeating the above process until the grating phase has converged to a desired tolerance to produce a converged grating phase, producing a desired laser spot array, where the desired laser spot array is uniformly printed in the regions where laser spots are desired and where the laser spots are prevented from printing in undesired regions without aperturing the laser beam.

In order to generate a large array of beamlets, a large and precise phase retardation must be added to the laser beam. This requires that large etch depths be precisely produced in optical materials. For the 12 degree sector described above, the maximum etch depth required in fused silica is 38 µm with a precision that is a fraction of a wave. This depth occurs over a scale length of half a unit cell or 2.5 mm. Although the phase profile is continuous and not rapidly varying, this precise depth becomes difficult with conventional etching techniques. An optional method of generating the grating is to use a multi-level procedure which can also meet the design criterion. A multi-level grating design is readily determined from the previously described continuous design. For the multi-level design the grating phase delay is folded to give a maximum phase delay of one wavelength (2.4 µm). This allows for accurate phase reproduction with the fewest number of discrete levels. Good reproduction of the beamlet array is generally found with 32 discrete levels which can be fabricated by etching sequentially with 5 binary masks. The masks are determined for etches of $\lambda/2, \lambda/4, \lambda/8, \lambda/16$, and $\lambda/32$ depth where $\lambda$ is the laser wavelength.

An artifact of the discrete multi-level approach is the sensitivity of the far-field beamlet pattern to errors in the first or $\lambda/2$ etch. Depth errors in this etch generally result in the production of an unscattered beamlet on the optical axis which can be significantly more energetic than the surrounding beamlets. This artifact can be mitigated by adding a linear tilt (blaze) to the grating phase distribution. The blaze shifts the desired pattern off-axis and allows the unscattered central beamlet to fall well outside the desired pattern region.

Changes and modifications in the specifically described embodiments can be carried out without departing from the scope of the invention, which is intended to be limited by the scope of the appended claims.

We claim:

1. A method for designing a phase plate, comprising:
    adding an assumed grating phase profile to a laser beam profile to calculate a modified laser beam profile;
    calculating a Fourier transform of said modified laser beam profile to produce a calculated far field laser beam comprising a plurality of beams;
    multiplying each beam of said plurality of beams that is located within a desired pattern by a filter according to the equation $$\text{filter} = \left[ 1 + \Delta \frac{I_{desired} - I}{I} \right]^{1/2}$$

to produce a modified far field, where $\Delta$ is a relaxation parameter that is a number that is between 0 and 1, I is calculated irradiance, and $I_{desired}$ is the desired irradiance at each beam of said plurality of beams within said desired pattern;
    multiplying each beam of said plurality of beams that is located outside said desired pattern and greater than a specified maximum threshold irradiance $I_{threshhold}$ by a second filter according to the equation $$\text{second filter} = \left[ 1 + \Delta \frac{I_{threshold} - I}{I} \right]^{1/2}$$

to produce a further modified far field;
    calculating the inverse Fourier transform of said further modified far field to obtain the near field at the location of said grating, wherein the new grating phase is extracted from said user field;
    scaling said near field at the location of said grating so that it matches the input laser irradiance profile, wherein said new grating phase is unchanged; and
    repeating the above process until the grating phase has converged to a desired tolerance to produce a converged grating phase, producing in the far field of an imaging lens a desired laser spot array, wherein said desired laser spot array is uniformly printed in the regions where laser spots are desired and wherein said laser spots are prevented from printing in undesired regions without aperturing said laser beam.

2. The method of claim 1, wherein said assumed grating phase profile comprises a lens like smoothly varying higher order grating phase profile.

3. The method of claim 2, wherein said lens like smoothly varying higher order grating phase profile comprises a lens like parabolic grating phase profile.

4. The method of claim 2, wherein said laser spot array comprises a generated laser spot array comprising an area having a scalloped shape.

5. The method of claim 4, wherein said scalloped shape is tailored with asymmetric left and right hand beam patterns to facilitate stitching or piecing individual sectors together to produce a continuous annulus having seamlessly stitched annulus sectors on a disk.

6. The method of claim 5, further comprising the step of varying the dimple height of said laser spots at different disk radii for increased performance, wherein dimple height is varied in a controlled fashion, wherein the irradiance in said laser spot array is specified as a prescribed profile rather than uniform.

7. The method of claim 1, wherein said assumed grating phase profile comprises an initial starting guess which gives rise to a continuous phase variation across the grating, wherein said initial starting guess comprises a lens-like phase profile across the grating unit cell.

8. The method of claim 7, further comprising adjusting the magnitude of said lens-like phase to control the angular spectrum of said array of laser spots to produce a grating which can be described as a two dimensional array of wavy lenslets with a spatial period corresponding to a required unit cell size.

9. The method of claim 1, wherein said converged grating phase comprises a grating phase delay which is folded to produce a multi-level grating of reduced total depth.

10. The method of claim 9, wherein said grating phase delay is folded to give a maximum phase delay of one wavelength.

11. The method of claim 10, further comprising adding a linear tilt (blaze) to the grating phase distribution of said converged grating phase, wherein depth errors in the $\lambda/2$ etch generally result in the production of an unscattered beamlet on the optical axis of said grating phase distribution which can be significantly more energetic than the surrounding beamlets, wherein said depth errors are mitigated by adding said linear tilt (blaze) to the grating phase distribution, wherein said blaze shifts the desired pattern off-axis and allows the unscattered central beamlet to fall well outside the desired pattern region.

12. A phase plate designed according to a method, comprising:
    adding an assumed grating phase profile to a laser beam profile to calculate a modified laser beam profile;
    calculating a Fourier transform of said modified laser beam to produce a calculated far field laser beam comprising a plurality of beams;

multiplying each beam of said plurality of beams that is located within a desired pattern by a filter according to the equation $$\text{filter} = \left[ 1 + \Delta \frac{I_{desired} - I}{I} \right]^{1/2}$$

to produce a modified far field, where $\Delta$ is a relaxation parameter that is a number that is between 0 and 1, I is calculated irradiance, and $I_{desired}$ is the desired irradiance at each beam of said plurality of beams within said desired pattern;

multiplying each beam of said plurality of beams that is located outside said desired pattern and greater than a specified maximum threshold irradiance $I_{threshhold}$ by a second filter according to the equation $$\text{second filter} = \left[ 1 + \Delta \frac{I_{threshold} - I}{I} \right]^{1/2}$$

to produce a further modified far field;

calculating the inverse Fourier transform of said further modified far field to obtain the near field at the location of said grating, wherein the new grating phase is extracted from said user field;

scaling said near field at the location of said grating so that it matches the input laser irradiance profile, wherein said new grating phase is unchanged; and repeating the above process until the grating phase has converged to a desired tolerance to produce a converged grating phase, wherein a phase plate having said converged grating phase produces a desired laser spot array, wherein said desired laser spot array is uniformly printed in the regions where laser spots are desired and wherein said laser spots are prevented from printing in undesired regions without aperturing said laser beam.

13. The phase plate of claim 12, wherein said assumed grating phase profile comprises a lens like smoothly varying higher order grating phase profile.

14. The phase plate of claim 13, wherein said lens like smoothly varying higher order grating phase profile comprises a lens like parabolic grating phase profile.

15. The phase plate of claim 13, wherein said laser spot array comprises an area having a scalloped shape.

16. The phase plate of claim 15, wherein said scalloped shape is tailored with asymmetric left and right hand beam patterns to facilitate stitching or piecing individual sectors together to produce a continuous annulus having seamlessly stitched annulus sectors on a disk.

17. The phase plate of claim 5, wherein the dimple heights of said laser spots are varied at different disk radii for increased performance, wherein said dimple heights are varied in a controlled fashion, wherein the irradiance in said laser spot array is specified as a prescribed profile rather than uniform.

18. The phase plate of claim 12, wherein said assumed grating phase profile comprises an initial starting guess which gives rise to a continuous phase variation across the grating, wherein said initial starting guess comprises a lens-like phase profile across the grating unit cell.

19. The phase plate of claim 18, wherein the magnitude of said lens-like phase is adjusted to control the angular spectrum of said array of laser spots to produce a grating which can be described as a two dimensional array of wavy lenslets with a spatial period corresponding to a required unit cell size.

20. The phase plate of claim 12, wherein said converged grating phase comprises a grating phase delay which is folded to produce a multi-level grating.

21. The phase plate of claim 20, wherein said grating phase delay is folded to give a maximum phase delay of one wavelength.

22. The phase plate of claim 21, further comprising a linear tilt (blaze) that is added to the grating phase distribution of said converged grating phase, wherein depth errors in or $\lambda/2$ etch generally result in the production of an unscattered beamlet on the optical axis of said grating phase distribution which can be significantly more energetic than the surrounding beamlets, wherein said depth errors are mitigated by adding said linear tilt (blaze) to the grating phase distribution, wherein said blaze shifts the desired pattern off-axis and allows the unscattered central beamlet to fall well outside the desired pattern region.

* * * * *